INVENTOR
Charles E. Nobles.

Oct. 18, 1960
C. E. NOBLES
2,957,171
RADAR SYSTEM
Filed Oct. 12, 1954
3 Sheets-Sheet 2
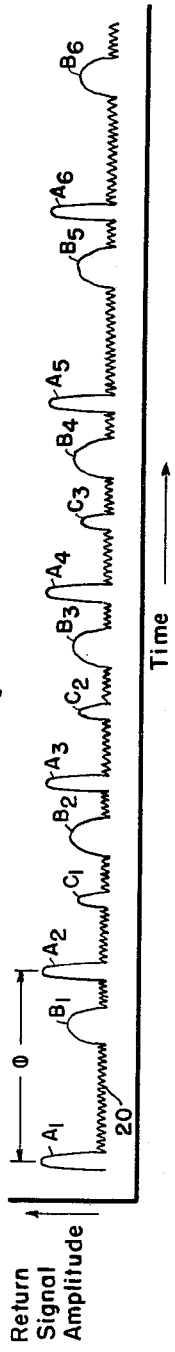
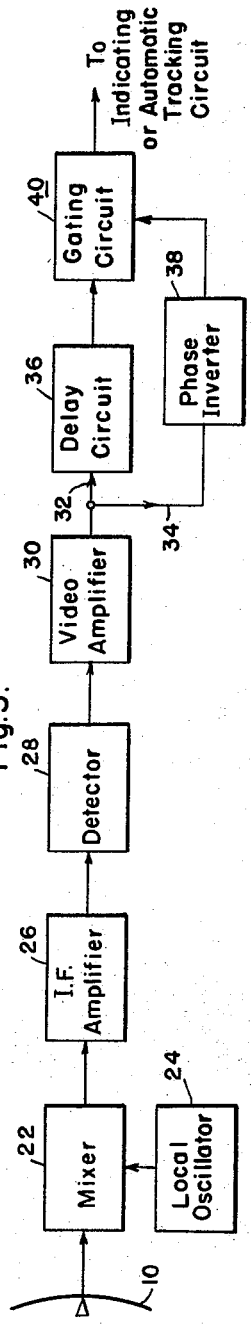
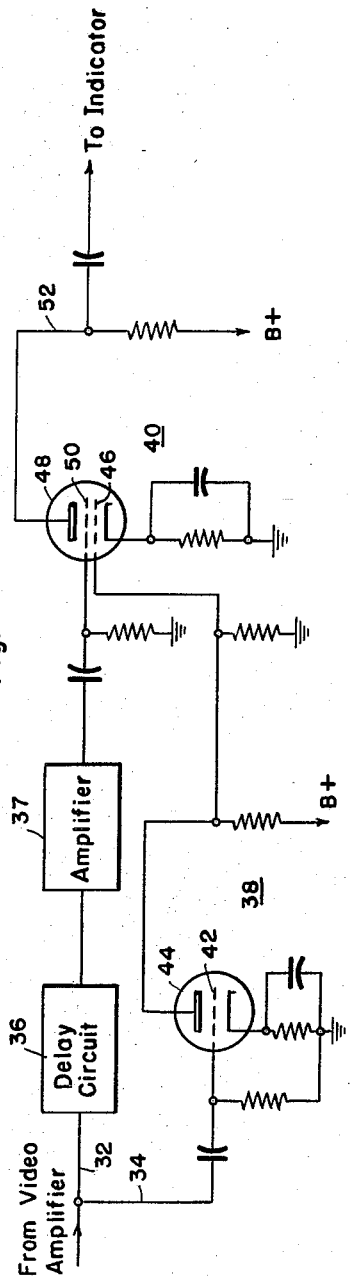

Oct. 18, 1960 C. E. NOBLES 2,957,171
RADAR SYSTEM
Filed Oct. 12, 1954 3 Sheets-Sheet 3

United States Patent Office 2,957,171
Patented Oct. 18, 1960

2,957,171

RADAR SYSTEM

Charles E. Nobles, Baltimore, Md., assignor to Westinghouse Electric Corporation, East Pittsburgh, Pa., a corporation of Pennsylvania Filed Oct. 12, 1954, Ser. No. 461,726

6 Claims. (Cl. 343—17.1)

This invention relates to radar systems and more particularly to means for reducing the effect of ground clutter in a radar system.

While searching for air-borne objects with a scanning radar system, difficulty is often encountered because a certain amount of the energy radiated from the radar antenna is reflected back to the antenna from the ground. In this respect the radar system detects too much, rather than too little, with the result that the picture on the radar scope is confused by unwanted echoes or "ground clutter." Unwanted echoes arise by virtue of the fact that ground reflections, together with reflections from true air-borne objects, are detected by the radar receiver and tend to clutter the indication on the radar scope. In other words, the unwanted ground reflections observed on the radar scope tend to obliterate the desired reflections from true air-borne objects.

Accordingly, it is an object of my invention to materially reduce the effects of undesirable ground clutter in a radar system. In accordance with my invention, hereinafter described, use is made of the fact that in scanning past a small air-borne object such as an airplane, the packet of returned echoes is smaller than the packet received from a large object such as the surface of the earth. In the preferred embodiment of the invention, the video output of the radar receiver is separated into two channels. The signals appearing in the first of these channels are applied to one of the grids of a tetrode amplifier tube with a polarity which is negative with respect to the cathode of the tube. The amplitude of ground reflections and air-borne object reflections in this negative channel is sufficient to cut off electron flow in the tube. Signals in the other channel are delayed in time and applied to the other grid of the tetrode tube with a positive polarity. The amount of delay effected in the second channel is just greater than the amount of time required for the scanning beam of the radar set to be on a small air-borne object such as an airplane. With this arrangement, the positive signal returns from air-borne objects will reach the one grid of the tetrode only after the negative returns in the first channel have been impressed on the other grid. Hence, the tetrode will conduct to indicate the existence of an air-borne object. Since the amount of delay in the second channel is only great enough to allow scanning of a small air-borne object, and since ground reflections persist in the video output of the radar receiver for a much greater time than the time required to scan the distant object, delayed and undelayed ground reflections in the respective channels will reach the grids of the tetrode at the same time. Therefore, the negative ground return signal will cancel the positive ground return signals and the returns from the air-borne object will pass to the indicator scope of the radar system.

Further objects and features of my invention will become apparent from the following description taken in connection with the accompanying drawings which form a part of the specification and in which:

Fig. 1b is a top view of Fig. 1a;

Fig. 2 is a plot showing the wave shape of a typical video signal produced by a radar receiver;

Fig. 3 is a block diagram of a radar receiver which incorporates my invention;

Fig. 4 is a schematic diagram of the gating circuit of my invention;

Figure 1A:
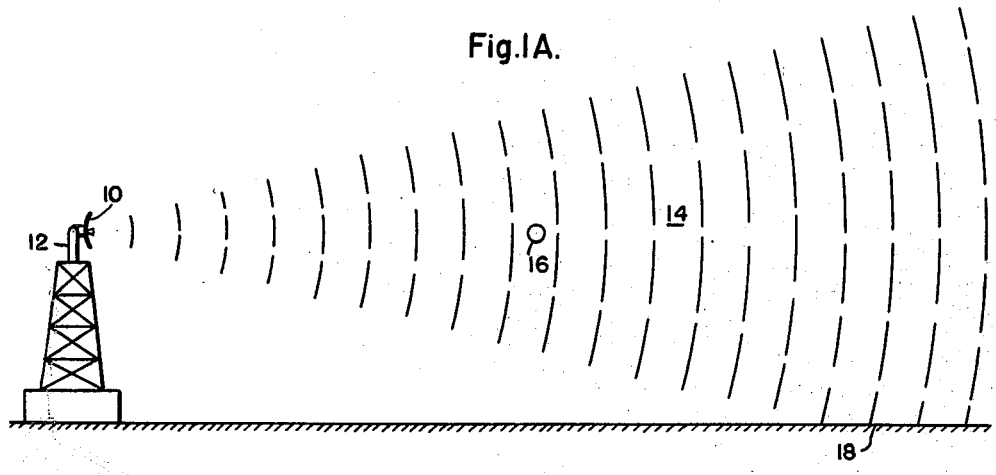
Figure 1a is a side view of the scanning beam of a radar antenna.
Figure 1B:
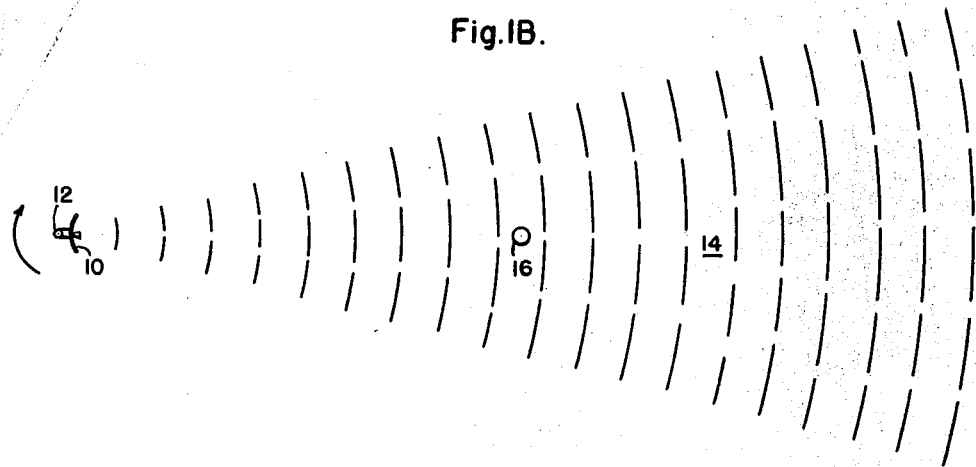

Referring to Figs. 1a and 1b, the general scheme of a radar scanning system is shown. A parabolic radar antenna 10 rotates about an axis 12. The radar beam 14 is conical in shape; and as it passes over various objects, reflections are sent back to the antenna 10 to be detected by the receiver of the radar set. In the illustration of Fig. 1, reflections will be received from air-borne object 16 and also from the surface of the ground since the beam strikes the ground at point 18. The reflections from the ground are those which clutter the indication on the radar scope, thereby making it difficult to observe and detect the returns from object 16.

It is to be understood that the circular scanning system shown in Fig. 1 is illustrative of only one type of scanning system which may be used with the present invention. Other well known types of scanning systems which may be used equally well are, for example, conical scanning and spiral scanning. Likewise, the radar antenna 10 need not be located on the ground but may be located on an aircraft if desired.

Referring to Fig. 2, the wave shape of the video output of the radar receiver includes various types of pulse forms which are repeated at uniform intervals. The transmitted pulse repetition rate of the radar transmitter is indicated by the time elapse $\phi$. As each pulse is transmitted, a certain amount of the RF energy will be deflected to the receiving portion of the radar antenna and detected by the receiver of the system. Hence, a series of pulses A1, A2, A3, etc. (called "main bangs") will appear in the video wave shape. As the successive transmitted pulses are sent out from the antenna of the system, ground reflections will be detected by the receiver and will appear as pulses B1, B2, B3, etc. The ground return pulses will occur between each "main bang" since a certain amount of the transmitted energy of each pulse will be reflected from the ground during this time. When the radar beam scans past an airborne object, such as object 16 shown in Fig. 1, a packet of reflected pulses will appear in the video wave form. These pulses are indicated in Fig. 2 as C1, C2, and C3. Since only three reflected pulses from object 16 appear in the wave form, it is apparent that the time required to scan object 16 is three times the pulse repetition rate. That is, since there are only three echoes reflected from object 16, only three pulses were generated by the radar transmitter during the time the beam intercepted object 16 as it traveled its circular path as shown in Fig. 1. Also included in the wave shape of Fig. 2 are small amplitude variations 20 called "noise." These small amplitude variations may be caused by any one of a number of factors which cause random electrical fluctuations in the received signal as, for example, thermal agitation.

In Figs. 3 and 4 it can be seen that the receiver of the radar system is of the superheterodyne type in which the frequency of an incoming signal is heterodyned to a new radio frequency (called the intermediate frequency), then amplified and finally detected. Received signals from antenna 10 are fed into a mixer circuit 22. In this circuit the incoming signals received from antenna 10 are mixed with the output of local oscillator 24 to produce the intermediate frequency referred to above. The output of mixer circuit 22 is amplified by amplifier 26 and then detected by the detector 28. The detected output is finally amplified by amplifier 30 to produce the wave form shown in Fig. 2. The output side of amplifier 30 leads to two channels 32 and 34. The signals in channel 32 are delayed by delay circuit 36 and those in channel 34 are inverted in phase by circuit 38. The signals from delay circuit 36 and circuit 38 are compared in gating circuit 40 to produce a tracking gate signal which is free from ground clutter.

Detailed operation of the tracking gate circuitry is shown in Fig. 4. The detected signals appearing in channel 34 have a positive polarity and are impressed on grid 42 of vacuum tube 44 in circuit 38. The output of tube 44 is an amplified signal having a negative polarity. The negative signal is impressed on grid 46 of tetrode tube 48 with an amplitude sufficient to cut off tube 48 whenever a pulse A, B or C appears in the signal. The signal in channel 32 is first delayed in circuit 36. Since this type of circuit (i.e., the delay circuit) is well known in the art, a detailed description of its operation is not included herein. It will be sufficient to say that circuit 36 delays the signals in channel 32 by an amount of time which is just greater than the time required for the radar beam 14 to scan a distant air-borne object as illustrated in Fig. 1a. After being delayed in circuit 36, the signals in channel 32 are amplified by amplifier 37 and applied to a second grid 50 of tube 48 with a positive polarity. Amplifier 37 is included in the present system since the delay circuit 36 is characteristically lossy and therefore, tends to reduce the amplitude of signals in channel 32.

Figure 5:
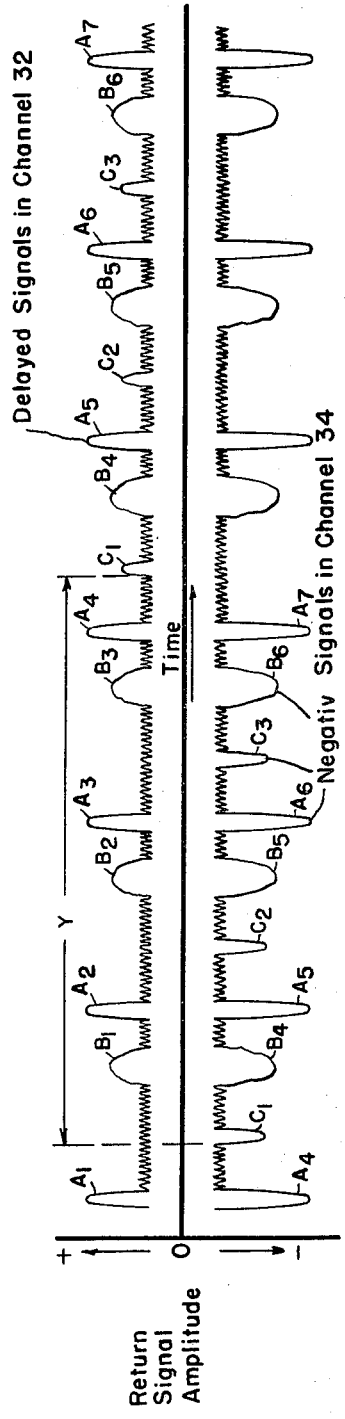
Fig. 5 is a plot of an example of the type of wave forms which might be impressed on the grids of the tetrode tube shown in Fig. 4.

Operation of the gating circuit can best be understood by reference to Fig. 5 which illustrates the wave-shapes applied to grids 46 and 50 of tube 48. It can be seen that each wave shape is substantially identical with that shown in Fig. 3, the only difference being that the signals in channel 34 now have a negative polarity and the signals in channel 32 are delayed by the time elapse γ. The signals in channel 34 are shown having a greater amplitude than those in channel 32. This relationship may be altered, depending upon the amplification effected in the respective channels. Whenever a pulse in channel 34 is applied to grid 46, tube 48 is cut off. Even though the main bangs (A1, A2, etc.) and the ground returns (B1, B2, etc.) in channel 32 are delayed by time elapse γ, they are received for a much longer time than time elapse γ and, therefore, they will be cancelled by other like signals in channel 34 which are not delayed. This factor is illustrated in Fig. 5 wherein delayed pulses A1, B1, A2, B2, etc. are cancelled by pulses A4, B4, A5, B5, etc. which lead the delayed pulses by time elapse γ. However, the returns from object 16 (C1, C2, C3) have all been impressed on grid 46 in channel 34 by the time the corresponding signals in channel 32 reach grid 50. Therefore, these signals, having a positive polarity, will pass to the plate circuit 52 of tube 48 and, hence, to the indicating scope of the radar set.

Figure 6:
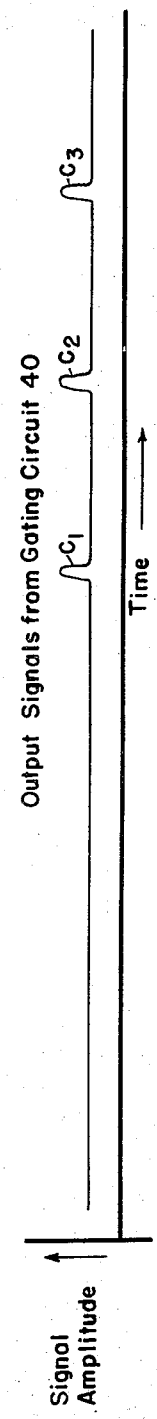
Fig. 6 is a plot of an ideal wave form which can be applied to the indicator scope of the radar set by use of the present invention.

Ideally, the signal in plate circuit 52 will appear as the wave form illustrated in Fig. 6. Actually, the wave form may include stray pulses not found in Fig. 6, since the "main bang" and ground return pulses in the respective channels may not completely cancel. In any event, the pulses C1, C2 and C3 will predominate in the output wave form and will clearly indicate the existence of an airborne object without interference from ground clutter. If the radar beam should leave contact with the ground, three of the pulsed ground return signals in delay channel 32 will be impressed on grid 50 after the last ground return pulses in channel 34 are impressed on grid 46. These three ground pulses will pass to output circuit 52 and will appear on the radar scope. However, the ground return signals will be sufficiently translated in time with respect to the pulses C1, C2 and C3 from object 16 so that the object returns will appear on the radar scope without interference from the three ground return signals which appear later in time.

Although my invention has been described in connection with a certain specific embodiment, it will be understood by those skilled in the art that various changes in form and arrangement of parts may be made to suit requirements without departing from the spirit and scope of the invention.

I claim as my invention:

1. In combination with a scanning radar system employing a receiver which is adapted to detect RF energy pulses which are reflected from a distant object, means for reducing the effects of ground clutter in said system and comprising the combination of a pair of channels into which the detected RF pulses are fed, a device in one of said channels for delaying the detected pulses appearing therein by an amount which is an integral multiple of the time elapse between successive transmitted pulses and which is slightly greater than the time required to scan a distant object, said time being further determined by the scanning rate and the distance of said object, a circuit for producing a tracking gate in response to pulsed signals received from said distant target, an electron discharge tube included in said circuit, an anode, cathode, and a pair of grids included in said tube, means for applying the delayed pulses in said one channel to the first of said grids with a polarity which is positive with respect to the cathode of said tube, and means for applying the undelayed pulses in the other of said channels to the second of said grids with a polarity which is negative with respect to said cathode.

2. In combination with a scanning radar system employing a receiver which is adapted to detect RF energy pulses which are reflected from a distant object, means for reducing the effects of ground clutter in said system and comprising a pair of channels into which the detected RF pulses are fed, a device in one of said channels for delaying the detected pulses appearing therein by an amount which is an integral multiple of the time elapse between successive transmitted pulses and which is substantially equal to the time required to scan a distant object, said time being further determined by the scanning rate and the distance of said object, and an electron discharge tube which conducts in response to the delayed signals appearing in said one channel, said tube being rendered non-conducting in response to the pulses appearing in the other of said channels.

3. In a scanning radar system employing a receiver which is adapted to detect target returns of radiated RF energy pulses, the combination of a pair of channels into which detected RF pulses are fed, a device in one of said channels for delaying signals appearing therein by an amount of time substantially equal to the time required to scan a distant object, said time being an even multiple of the time elapse between successive transmitted pulses and being further determined by the scanning rate of the system and the range of a target, an electron discharge tube having an anode and a cathode included therein, first and second grids for said tube, means for applying the delayed signals in said one channel to the first of said grids with a polarity which is positive with respect to the cathode of said tube, and means for applying the undelayed signals in the other of said channels to the second of said grids with a polarity which is negative with respect to the cathode of said tube whereby the tube will be rendered non-conducting in response to signals appearing in said other channel.

4. In a scanning radar system including a receiver for RF energy pulses which are reflected from a distant object, a system for reducing the effects of ground clutter in said receiver and comprising a pair of channels into which received energy pulses are fed, means in one of said channels for delaying the signals appearing therein by an amount of time substantially equal to the time required to scan a distant object, said time being an even multiple of the time elapse between successive transmitted pulses and being further determined by the scanning rate of the system and the range of said object, and means connected to said channels and responsive to the signals appearing therein for producing an output signal only in response to energy pulses reflected from said distant object.

5. The combination claimed in claim 4, wherein the output signal producing means is rendered conducting in response to the delayed signals in said one channel and non-conducting in response to undelayed signals in said other channel.

6. Apparatus for separating continuously re-occurring pulsed signals in a train of signals from pulsed signals which appear in said train for a predetermined period of time, said apparatus including a pair of channels into which said train of signals are fed, means in one of said channels for delaying the signals appearing therein by a time substantially equal to said predetermined period of time, an electron valve having at least two control electrodes included therein, and means for applying the signals appearing in the respective channels to said control electrodes with opposite polarities.

References Cited in the file of this patent

UNITED STATES PATENTS

| | | |
|---|---|---|
| 2,523,283 | Dickson | Sept. 26, 1950 |
| 2,566,189 | Gloess | Aug. 28, 1951 |
| 2,659,079 | Cunningham | Nov. 10, 1953 |
| 2,659,080 | Benfield | Nov. 10, 1953 |
| 2,714,205 | Grayson et al. | July 26, 1955 |